United States Patent
Gupta et al.

(10) Patent No.: US 10,824,412 B2
(45) Date of Patent: Nov. 3, 2020

(54) METHOD AND APPARATUS FOR DATA DRIVEN AND CLUSTER SPECIFIC VERSION/UPDATE CONTROL

(71) Applicant: Nutanix, Inc, San Jose, CA (US)

(72) Inventors: Karan Gupta, San Jose, CA (US); Amit Jain, San Jose, CA (US); Avinash Manjaya Shetty, Palo Alto, CA (US); Harry Hai Yang, Sunnyvale, CA (US); Jie Li, San Jose, CA (US); Krishna Ganti, Sunnyvale, CA (US); Paul Michael Digioia, Livermore, CA (US); Pavan Kumar Konka, Milpitas, CA (US); Ranjan Parthasarathy, Milpitas, CA (US); Yang Xiao, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 15/964,928

(22) Filed: Apr. 27, 2018

(65) Prior Publication Data

US 2019/0332369 A1    Oct. 31, 2019

(51) Int. Cl.
    *G06F 8/65*    (2018.01)
    *G06F 3/06*    (2006.01)
    (Continued)

(52) U.S. Cl.
    CPC .............. *G06F 8/65* (2013.01); *G06F 3/0607* (2013.01); *G06F 3/067* (2013.01); *G06F 3/0631* (2013.01); *G06F 8/61* (2013.01); *G06N 20/00* (2019.01)

(58) Field of Classification Search
    CPC ...... G06F 3/0607; G06F 3/0631; G06F 3/067; G06F 8/61; G06F 8/65; G06N 20/00; G06N 99/005
    (Continued)

(56) References Cited

U.S. PATENT DOCUMENTS 7,519,691 B2 *   4/2009   Nichols ............... H04L 41/0803
                                                  709/219
8,321,858 B1 *  11/2012   Marmaros ................ G06F 8/65
                                                  717/173
(Continued)

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).
(Continued)

*Primary Examiner* — Andrew M. Lyons
(74) *Attorney, Agent, or Firm* — Vista IP Law Group, LLP

(57) ABSTRACT

A method and apparatus for data driven and cluster specific version/update control. The apparatus includes an automated multi-clusters management apparatus that interfaces with a plurality of remote clusters to provide data driven version/update control on a cluster by cluster basis. Generally, operation includes collection/identification of cluster specific data pertaining to software, hardware, and cluster requirements. The cluster specific data is later compared/analyzed against multi-cluster data pertaining to software releases, hardware characteristics, and known bugs/issues for each. The results of the comparison/analysis can then be ranked according to various metrics to different possible solutions and to differentiate the less desirable results from the more desirable results. Thus, the automated multi-cluster management apparatus provides for selection of versions/updates that is dependent on the cluster specific data. Additionally, the present disclosure provides for scheduling and distribution planning for selected versions/updates.

24 Claims, 12 Drawing Sheets

(51) Int. Cl.
*G06F 8/61* (2018.01)
*G06N 20/00* (2019.01)

(58) Field of Classification Search
USPC .................................................. 717/168–178
See application file for complete search history.

(56) References Cited

U.S. PATENT DOCUMENTS

| | | | |
|---|---|---|---|
| 8,549,518 B1 | 10/2013 | Aron et al. | |
| 8,601,473 B1 | 12/2013 | Aron et al. | |
| 8,656,343 B2* | 2/2014 | Fox | G06F 8/65 717/101 |
| 8,776,044 B1* | 7/2014 | Vaidya | G06F 9/542 717/171 |
| 8,850,130 B1 | 9/2014 | Aron et al. | |
| 9,063,818 B1* | 6/2015 | Risbood | G06F 8/65 |
| 9,158,525 B1* | 10/2015 | Naganathan | G06F 8/65 |
| 9,176,728 B1* | 11/2015 | Dixit | G06F 8/71 |
| 9,772,866 B1 | 9/2017 | Aron et al. | |
| 10,168,953 B1* | 1/2019 | Gupta | G06F 3/0659 |
| 10,198,255 B2* | 2/2019 | Higginson | G06F 11/3664 |
| 10,310,842 B1* | 6/2019 | Miller | G06F 8/65 |
| 2006/0130042 A1* | 6/2006 | Dias | G06F 9/5083 717/168 |
| 2007/0233782 A1* | 10/2007 | Tali | G06F 8/61 709/203 |
| 2008/0168436 A1* | 7/2008 | Shwartz | G06F 8/61 717/174 |
| 2011/0029964 A1* | 2/2011 | Kobayashi | G06F 8/656 717/171 |
| 2011/0083127 A1* | 4/2011 | Georgis | G06F 8/61 717/173 |
| 2011/0099266 A1* | 4/2011 | Calder | G06F 8/65 709/224 |
| 2011/0225575 A1* | 9/2011 | Ningombam | G06F 8/65 717/170 |
| 2012/0110150 A1* | 5/2012 | Kosuru | H04L 41/082 709/221 |
| 2012/0290441 A1* | 11/2012 | Mahaniok | G06F 8/60 705/26.62 |
| 2012/0291022 A1* | 11/2012 | Mehta | G06F 8/60 717/176 |
| 2013/0055155 A1* | 2/2013 | Wong | G06F 8/65 715/810 |
| 2014/0013315 A1* | 1/2014 | Genevski | G06F 8/60 717/170 |
| 2015/0074644 A1* | 3/2015 | Oberheide | G06F 16/2455 717/122 |
| 2015/0095321 A1* | 4/2015 | Procopio | G06F 16/24578 707/723 |
| 2015/0365351 A1* | 12/2015 | Suit | G06F 9/45558 709/226 |
| 2015/0378716 A1* | 12/2015 | Singh | H04W 4/60 717/172 |
| 2016/0072913 A1* | 3/2016 | Baldwin | H04L 67/306 709/201 |
| 2016/0132316 A1* | 5/2016 | Hu | H04L 67/34 717/171 |
| 2016/0203008 A1* | 7/2016 | Cui | G06F 9/455 718/1 |
| 2016/0239281 A1* | 8/2016 | Avisror | G06F 8/61 |
| 2016/0274893 A1* | 9/2016 | Thomas | G06F 8/61 |
| 2017/0034023 A1* | 2/2017 | Nickolov | H04L 43/0817 |
| 2017/0078160 A1* | 3/2017 | Hong | H04L 67/32 |
| 2017/0115978 A1* | 4/2017 | Modi | G06F 8/65 |
| 2017/0124526 A1* | 5/2017 | Sanderford | G06Q 10/1095 |
| 2017/0207980 A1* | 7/2017 | Hudis | H04L 41/145 |
| 2017/0372173 A1* | 12/2017 | Kairali | G06K 9/6218 |
| 2018/0067736 A1* | 3/2018 | De Zaeytijd | G06F 8/65 |
| 2018/0129492 A1* | 5/2018 | Singh | G06F 8/65 |
| 2018/0189048 A1* | 7/2018 | Bala | G06F 8/656 |
| 2018/0234487 A1* | 8/2018 | Zalpuri | H04L 67/10 |
| 2018/0285086 A1* | 10/2018 | O'Malley | G06F 8/65 |
| 2018/0293059 A1* | 10/2018 | Armand | G06F 8/61 |
| 2018/0293152 A1* | 10/2018 | Sherafat Kazemzadeh | H04L 67/34 |
| 2018/0300180 A1* | 10/2018 | Shepard | G06F 11/0709 |
| 2018/0341865 A1* | 11/2018 | Lu | G06N 5/022 |
| 2019/0102564 A1* | 4/2019 | Li | G06F 21/577 |
| 2019/0108015 A1* | 4/2019 | Sridhara | G06Q 30/0282 |
| 2019/0129705 A1* | 5/2019 | Bulut | G06N 20/00 |
| 2019/0163463 A1* | 5/2019 | Bulut | G06F 8/65 |
| 2019/0222325 A1* | 7/2019 | Klassen | H04B 17/101 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Cano, I. et al., "Curator: Self-Managing Storage for Enterprise Clusters", *14th USENIX Symposium on Networked Systems Design and Implementation, NSDI '17*, (Mar. 27, 2017).

* cited by examiner

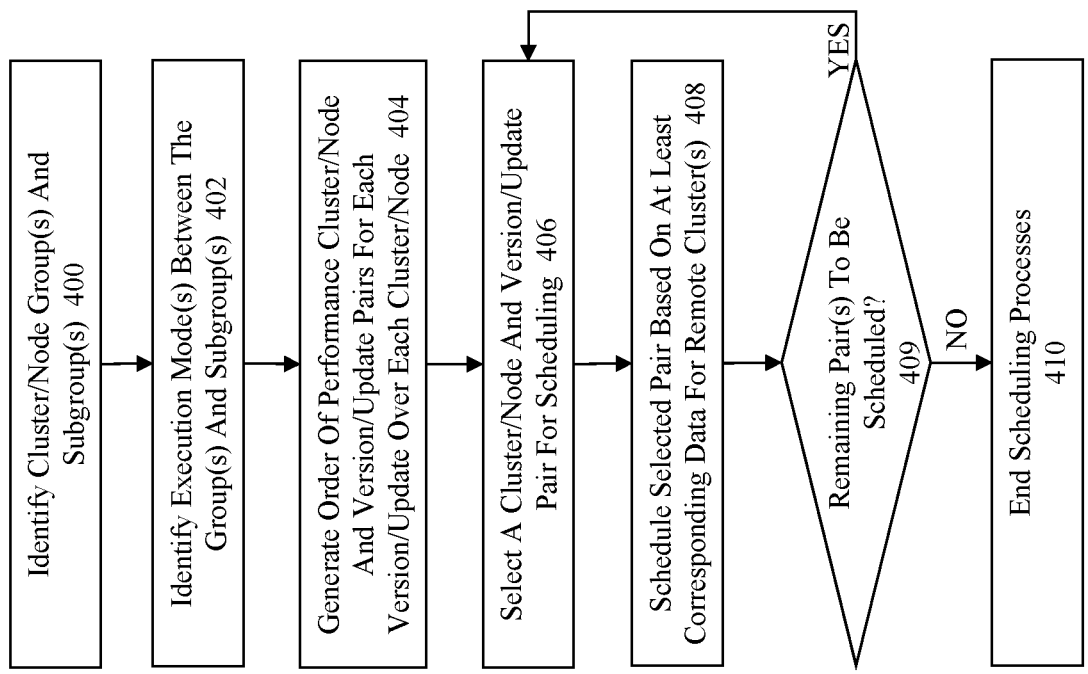

METHOD AND APPARATUS FOR DATA DRIVEN AND CLUSTER SPECIFIC VERSION/UPDATE CONTROL

FIELD

This disclosure concerns a method and apparatus for data driven and cluster specific version/update control.

BACKGROUND

Current methods for managing updates and version control suffer from a one size fits all approach. For instance, current solutions merely determine if a target system is operating on the latest version of a distribution, where if the target system is not operating on the latest version, updates are selected to bring the target system up to the latest version.

However, executing version control merely based on the availability of later version fails to consider the actual use which the target system is being put to or how the update will affect the target system. This can present many problems, e.g. the update may overtax the hardware of the target system, the update may break or decrease the reliability of software used on the target system, the update may hinder the target systems intended use, or the update may cause a communication mechanism between systems/software to cease functioning.

Therefore, what is needed is a method and apparatus for data driven and cluster specific version/update control.

SUMMARY

The present disclosure concerns methods and apparatus for data driven and cluster specific version/update control.

The apparatus includes an automated multi-clusters management apparatus that interfaces with a plurality of remote clusters to provide data driven version/update control on a cluster by cluster basis. Generally, operation includes collection/identification of cluster specific data pertaining to software, hardware, and cluster requirements. The cluster specific data is later compared/analyzed against multi-cluster data pertaining to software releases, hardware characteristics, and known bugs/issues for each. The results of the comparison/analysis can then be ranked according to various metrics to different possible solutions and to differentiate the less desirable results from the more desirable results. Thus, the automated multi-cluster management apparatus provides for selection of versions/updates that is dependent on the cluster specific data. Additionally, the present disclosure provides for scheduling and distribution planning for selected versions/updates.

Further details of aspects, objects, and advantages of the disclosure are described below in the detailed description, drawings, and claims. Both the foregoing general description and the following detailed description are illustrative and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. To better appreciate the advantages and objects of embodiments of the invention, reference should be made to the accompanying drawings. However, the drawings depict only certain embodiments of the invention, and should not be taken as limiting the scope of the invention.

FIG. 4A illustrates a flowchart for scheduling version(s)/update(s) for respective remote clusters in accordance with some embodiments.

DETAILED DESCRIPTION OF THE EMBODIMENTS OF THE INVENTION

The present disclosure concerns methods and apparatus for data driven and cluster specific version/update control.

Various embodiments are described hereinafter with reference to the figures. It should be noted that the figures are not necessarily drawn to scale. It should also be noted that the figures are only intended to facilitate the description of the embodiments and are not intended as an exhaustive description of the invention or as a limitation on the scope of the invention. In addition, an illustrated embodiment need not have all the aspects or advantages shown. An aspect or advantage described in conjunction with a particular embodiment is not necessarily limited to that embodiment and can be practiced in any embodiments even if not so illustrated. Also, reference throughout this specification to "some embodiments" means that a particular feature, structure, material or characteristic described in connection with the embodiments is included in at least one embodiment. Thus, the appearances of the phrase "in some embodiments" in various places throughout this specification are not necessarily referring to the same embodiment.

Figure 1:
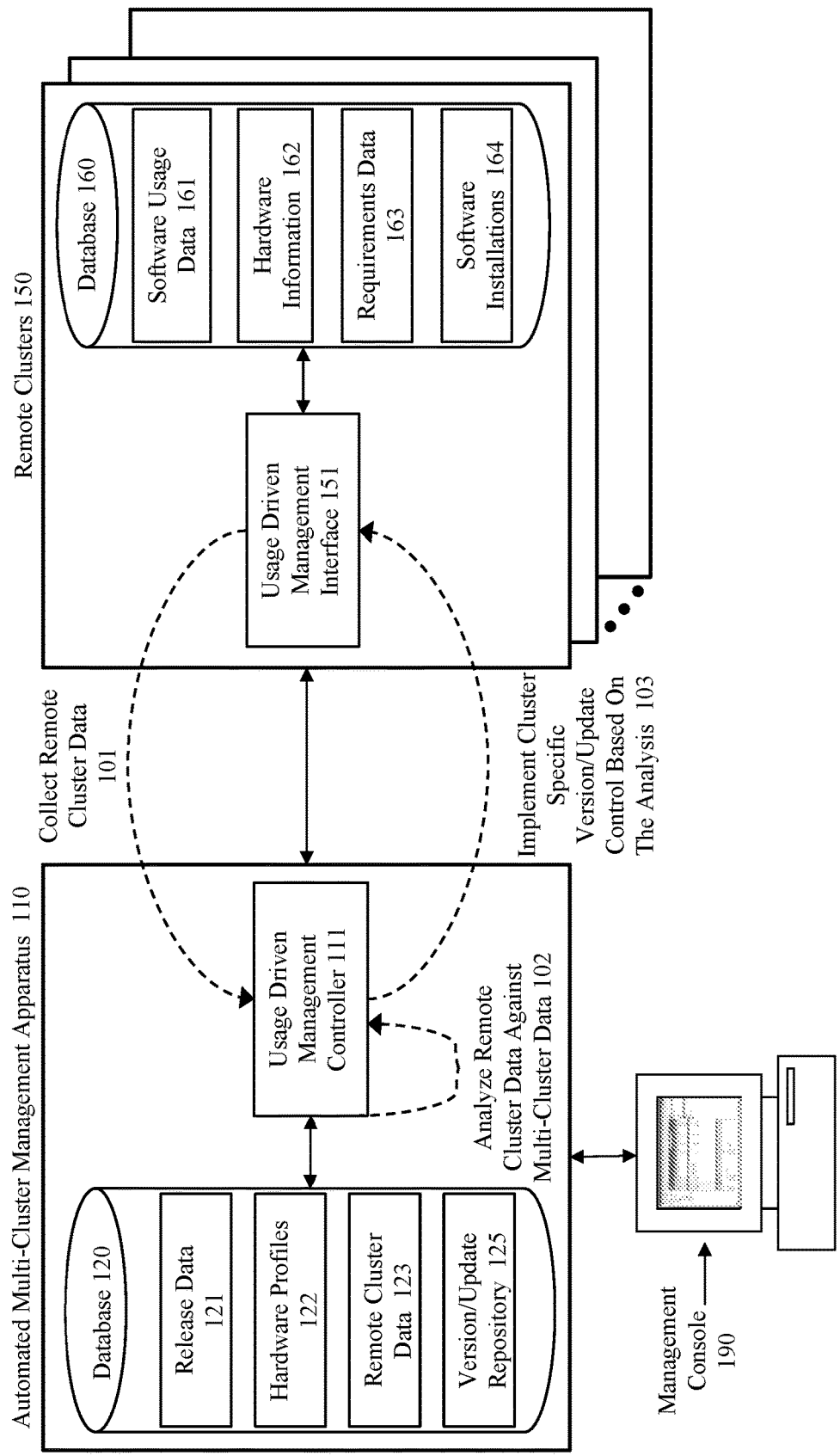
FIG. 1 illustrates an approach for data driven and cluster specific version/update control in which some embodiments are implemented.

FIG. 1 illustrates an approach for data driven and cluster specific version/update control in which some embodiments are implemented. The illustration of FIG. 1 includes a management apparatus that interfaces with multiple remote clusters to implement cluster specific version/update control based on analysis of remote cluster data against multi-cluster data. The figures described herein are illustrative of embodiments for the purposes of explaining the disclosed invention. However, any embodiments may be used within the scope and spirit of this disclosure.

The illustrated approach includes an automated multi-cluster management apparatus (management apparatus) 110 coupled to remote clusters 150 and to a management console 190. The approach implements cluster specific version/update control based on analysis of data particular to respective remote clusters managed by the multi-cluster management process to implement version control based on the data particular to those remote clusters—e.g. analyzes remote cluster data against multi-cluster data comprising at least release data and hardware profiles. For example, during the management of three different clusters, a first cluster is selected to be updated to a latest software version X, while a second cluster is updated to a different software version Y, and the third cluster is not updated at all despite operating with a software version Z that is different from versions X and Y. For instance, to manage the second cluster data from the second cluster at a retail location shows that the cluster is primarily utilized as an inventory management system and operation of sales registers and that one or more pieced of corresponding software are out of date. However, further analysis of the remote cluster data against the multi-cluster data by the management apparatus reveals that the latest version suffers from a critical bug and excessive slow down for a particular feature used at the second cluster, while a different version offers improved reliability and performance over the version currently installed on the remote cluster. Therefore, the usage driven management controller will determine that the different version is the better version over both the already installed version and the latest version. Similar processing is performed for first and third cluster. Thus, the management apparatus analyzes remote cluster data against multi-cluster data to implement cluster specific version/update control based, as opposed to based merely on availability of an update.

The management apparatus 110 includes a usage driven management controller 111 that collects remote cluster data (see 101), analyzes the collected remote cluster data against multi-cluster data (see 102), and implements cluster specific version/update control based on the analysis (see 103). Generally, this includes: storing collected remote cluster data in remote cluster data 123, collecting remote cluster data pertaining to the software being used on any particular remote cluster (see software usage data 161), the hardware configuration(s) of the particular remote cluster (see hardware information 162), requirements data specifying requirements of the remote cluster (see requirements data 163), and information pertaining to the installed software on the remote cluster (see software installations 164); analyzing the collected data against multi-cluster data (see release data 121, hardware profiles 122); and selection of any appropriate versions/updates from version/update repository 125.

As illustrated, database 120 includes the release data 121, hardware profiles 122, remote cluster data 123, and version/update repository 125, stored in a single database 120. However, in some embodiments the data could be store in one or more separate databases or any combination thereof. The release data generally provides information describing characteristics of releases in a machine-readable format—e.g. type, features, requirements, and known bugs/issues. Hardware profiles 122 includes hardware feature compatibility information, performance ranking/rating/categorization information, and known bugs/issues. Remote cluster data 123 comprises any combination of features requirements, security requirements, performance requirements, and current configuration information collected from remote clusters and store either temporarily or persistently. Version/update repository 125 contains updates and standalone versions of software which may be provided to remote clusters as part of implementing cluster specific version/update control based on the analysis.

In some embodiments, the automated multi-cluster management apparatus 110 is managed using a management console 190, or via user stations, or other devices that include any type of computing station that may be used to operate or interface with the management apparatus. Examples of such management consoles, user stations, and other devices include, for example, workstations, personal computers, servers, or remote computing terminals. In some embodiments, the management consoles also include one or more input devices for the user to provide operational control over the activities of the system, such as a mouse or keyboard to manipulate a pointing object in a graphical user interface. The management console may be used to update data in the database 120, such as by adding new versions/updates to the version/update repository 125, adding release data for the versions/updates to release data 121, or adding new hardware profiles to hardware profiles 122 e.g. a new configuration of hardware not previously identified. Furthermore, the management apparatus can be used to update any previously added release data, hardware profiles, or remote cluster data.

Remote clusters 150 may comprise any number of clusters. For instance, a large international retailer may have one or more clusters at each retailer store, branch office, regional office, and/or corporate headquarters. Furthermore, remote clusters 150 may include clusters from multiple different entities—e.g. multiple clusters from airline companies, medical care companies, insurers, or any other entities. The remotes clusters separately maintain data such as data corresponding to database 160 comprising data pertaining to the current and past configuration and usage data including software usage data 161, hardware information 162, requirements data 163, and software installations 164. The software usage data 161 corresponds to usage information for the various software installed on the remote cluster such as one or more factors indicating the utilization of the respective pieces of software installed on the cluster, software crash data, or other relevant software related data. The hardware information includes information specifying the current configuration of the cluster (e.g. processors, volatile and non-volatile memory, network connections, etc.) and utilization information thereof. Requirements data 163, may be provided by the remote cluster administrator and gathered through dependency analysis based on the remotes clusters installed software 164 and hardware information 162.

The remotes clusters 150 also include usage driven management interface 151. The usage driven management interface 151 communicates with the usage driven management controller 111 to exchange remote cluster data (see 161-164) with the management apparatus 110 and to perform local execution of one or more processes to implement cluster specific version/update control based on the analysis of the remote cluster data against the multi-cluster data. For instance, the usage driven management interface 151 communicates one or more updates to be installed on a remote cluster to an automated update management process and communicates success/failure information to the usage driven management controller 111.

Figure 2:
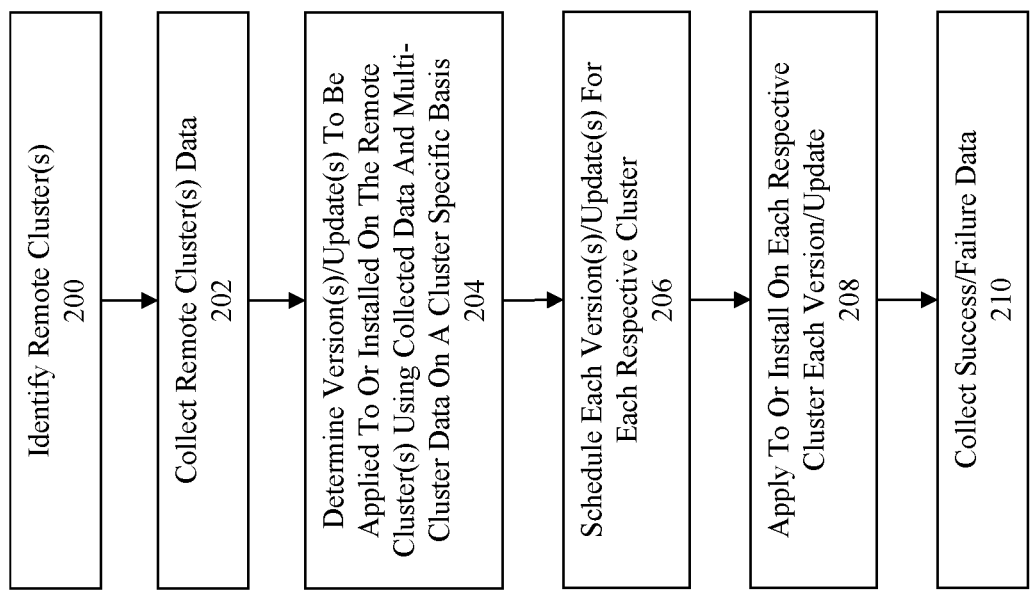
FIG. 2 illustrates a flowchart for data driven and cluster specific version/update control in accordance with some embodiments.

FIG. 2 illustrates a flowchart for data driven and cluster specific version/update control in accordance with some embodiments.

The process starts at 200, where remote clusters are identified for performance of data driven and cluster specific version/update control. Identified clusters may comprise any combination of remote clusters whether identified based on one or more parameters—e.g. function, location, region, company, division, or any combination thereof. The identification of the clusters can be completed by any combination of selecting or filtering of remote clusters identified in a database of remote clusters. For instance, all remote clusters at north american retail locations for company X can be identified for processing by performing selection and filtering on a data structure that maintains at least cluster categorization and identification information e.g. a list, table, or any other appropriate data structure. The data structure itself may be populated in any number of ways including manual entry, as a result of self-identification upon initial creation, in response to an update request from a remote cluster, by application of one or more configuration files that causes the remote cluster to register or be registered with the management apparatus, using a factory configured identifier, or any combination thereof. In some embodiments, the identified clusters comprise all clusters managed by the management apparatus or only a subset of clusters identified such as only those associated with a particular entity.

Regardless of whether all clusters or a subset of the identified clusters are identified for performance of data driven and cluster specific version/update control, the process continues at 202 where remote cluster data is collected for the identified clusters. For instance, for each remote cluster identified, data maintained in database 160 is transmitted by the usage driven management interface 151 to the usage drive management controller 111 and stored in corresponding locations in the remote cluster data 123 of database 120. In some embodiments, remote cluster data 123 already stored in database 120 is updated for each remote cluster identified. In some embodiments, data collected may be limited to a specified time range (e.g. days, weeks, months, years, etc.). In some embodiments, data is collected according to a schedule, or collected only when the amount of time from the last update is greater than a threshold amount of time. In some embodiments, data is collected upon registration in the automated multi-cluster management process and updated upon a triggering event (e.g. receiving an update request from a remote cluster or upon the occurrence of a scheduling event/reminder). As will be discussed in further detail below, the collected data comprises software usage data 161, hardware information 162, requirements data 163, and software installations 164.

At 204, the version(s)/update(s) to be applied to or installed on the remote cluster(s) using collected data and multi-cluster data on a cluster specific basis are determined. This will be discussed in further in regard to FIGS. 3A-B. However, the process generally includes performing matching analysis against collected data for each remote cluster against a set of multi-cluster data and performing ranking analysis to determine which version(s)/update(s) to apply, if any.

In some embodiments, any version(s)/update(s) to be applied as identified in 204 are subsequently scheduled at 206. Scheduling will be discussed in further regarding FIGS. 4A-B. Briefly, scheduling can be performed over different groups and subgroups of remote clusters having different update flows and dependencies.

At 208, the different version(s)/update(s) can be applied at the level of the remove cluster. Applying updates can be performed using any appropriate technique as is known in the art. Additionally, the application/installation of each version(s)/update(s) can be coordinated by the management apparatus. For instance, the management apparatus acts as a conductor indicating to a second remote cluster that scheduled updates can be completed at the second remote cluster only after the first remote cluster reports completion of the same updates. In some embodiments, the management apparatus can coordinate groups or subgroups of remote clusters executing version changes at the same time, such as when multiple groups contain multiple subgroups, and wherein the groups execute changes serially, and the subgroups execute changes in parallel. In some embodiments, the application of the different version(s)/update(s) are predicated on clusters or nodes thereof having a specified idle time state (e.g. 80% idle state characteristic for a previous time period, or currently 80% idle). Thus, idle time state information can be used to confirm that an expected idle time state is the same as or similar to (within a threshold amount) the actual state of the cluster or node(s) before the different version(s)/update(s) are applied.

At 210, success and failure information can be collected for the scheduled version(s)/update(s). Such data can be aggregated and stored for future analysis and for distillation of pertinent information into step 204. For example, a particular update may fail on clusters having a particular firmware version. Thus, during subsequent determinations the past failures would be used to lower the likelihood that that particular update will be selected for clusters having that same firmware version or will be used to identify an appropriate firmware update that corrects the issue.

Figure 3A:
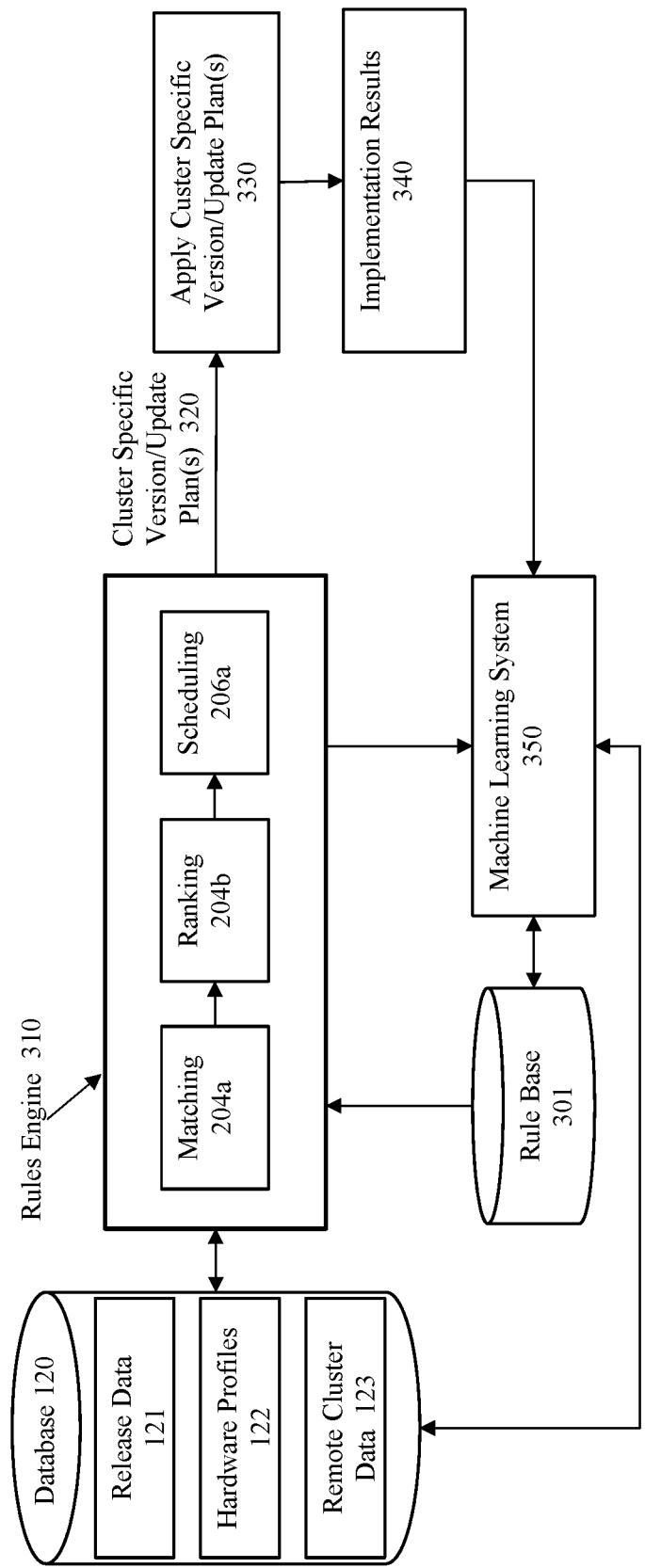
FIG. 3A illustrates a system for determining version(s)/update(s) to be applied to or installed on the remote cluster(s) using collected data and multi-cluster data on a cluster specific basis in accordance with some embodiments.

FIG. 3A illustrates a system for determining version(s)/update(s) to be applied to or installed on the remote cluster(s) using collected data and multi-cluster data on a cluster specific basis in accordance with some embodiments.

The system includes a rules engine 310 that includes matching 204a, ranking 204b, and scheduling 206a. Matching and ranking will be discussed further in regard to FIG. 3B. Similarly, scheduling 206a will be discussed further in regard to FIGS. 4A-B. However, briefly, matching 204a, ranking 204b, and scheduling 206a comprise execution of logical and arithmetic operations to implement a set of rules maintained in a rule base 301 against the release data 121, and hardware profiles 122 and remote cluster data 123 to match, rank, and schedule identified update/version changes. Database 120, comprises release data 121, hardware profiles 122, and remote cluster data 123 as discussed previously.

Once the rules engine has completed the matching, ranking, and scheduling cluster specific version/update plan(s) are output at 320. The Cluster specific version/update plan(s) 320 are then applied to the determined remote clusters at 330 corresponding to 208 of FIG. 2. Finally, the results of the implementation are then gathered and transmitted to the machine learning system 350 corresponding to 210 of FIG. 2.

The machine learning system 350 makes changes to the rule base 301 in response to the received implementation results. For instance, machine learning system 350 receives a cluster specific version/update plan for a group of remote clusters and implementation results of the execution of that plan. Through a comparison of expected parameters vs received parameters the learning system updates one or more rules in the rule base 301 corresponding to matching, ranking, and/or scheduling.

For example, the machine learning system 350 receives information indicating a failed installation. In some embodiments, parameters corresponding to the failed installation might be logged for future analysis for other similar errors. However, one error is not necessarily due to an incompatibility, but multiple errors may provide such an indication. If, subsequent additional error information is received that shares a commonality with the parameters associated with the failed instance, those errors may be a result of a previously unidentified incompatibility. Thus, upon the occurrence of a threshold number of errors (e.g. 10) associated with the same commonality (e.g. network driver) the machine learning system updates the rule base 301 require that the particular commonality (e.g. the network driver) not be present in future matching results.

The machine learning system 350 can also create, update, or delete, rules corresponding to ranking of the matching solutions. For instance, if we use the example above, instead of updating the matching rules or in the alternative prior to updating the matching rules upon the occurrence of a lower threshold (e.g. five) the ranking may be lowered due to the machine learning system updating a ranking value corresponding to reliability to result in a less desirable rank (e.g. lowering a reliability rating for the specific hardware and software combination).

In another example, the machine learning system 350 determines that on average the time for completion of each respective update for each cluster took approximately 10% more time to complete then the expected time, and thus updates one or more corresponding rules in the rule base 301 to reflect the error in the estimation. In some embodiments, the learning system 350 uses one or more thresholds and weighting factors to limit overcorrection. For instance, a threshold of at least a 1% error can be applied before allowing a correction or adjustment to the rule base. Furthermore, the weighting factor can be used to limit the amount of each adjustment. For instance, adjusts are performed only in a proportional manner, e.g. a 50% error in estimation could be used to move the estimation 50% of the error closer to the measured parameter, and a 10% error in estimation could be used to move the estimation 10% of the error closer to the measured parameter. As an example, assuming all other things are equal, a first plan is executed for a first set of hardware resulting in a 50% error in the estimated time to complete and a 25% (50% of the 50% error) correction (e.g. estimated 10 minutes to complete, but took 15 minutes to complete, and correction, had it been implemented previously would have caused an estimate of 12.5 minutes to complete). If the same plan is subsequently implemented on an otherwise identical cluster the estimate would be 12.5 minutes to complete, the resulting error would be 2.5 minutes or 20%, and the subsequent correction would be 10% or 1.25 minutes.

In some embodiments, the machine learning system also updates the database 120, such as by updating the remote cluster data 123 to indicate a change in software versions for corresponding remote clusters and to update failure information regarding hardware profiles 122 (e.g. frequency of firmware installation failure rates), or release data 121 (e.g. frequency of software installation failure rates). Furthermore, in some embodiments the rule base 301 is updated to account for particular hardware/software success/failure rates for particular version(s)/update(s).

Figure 3B:
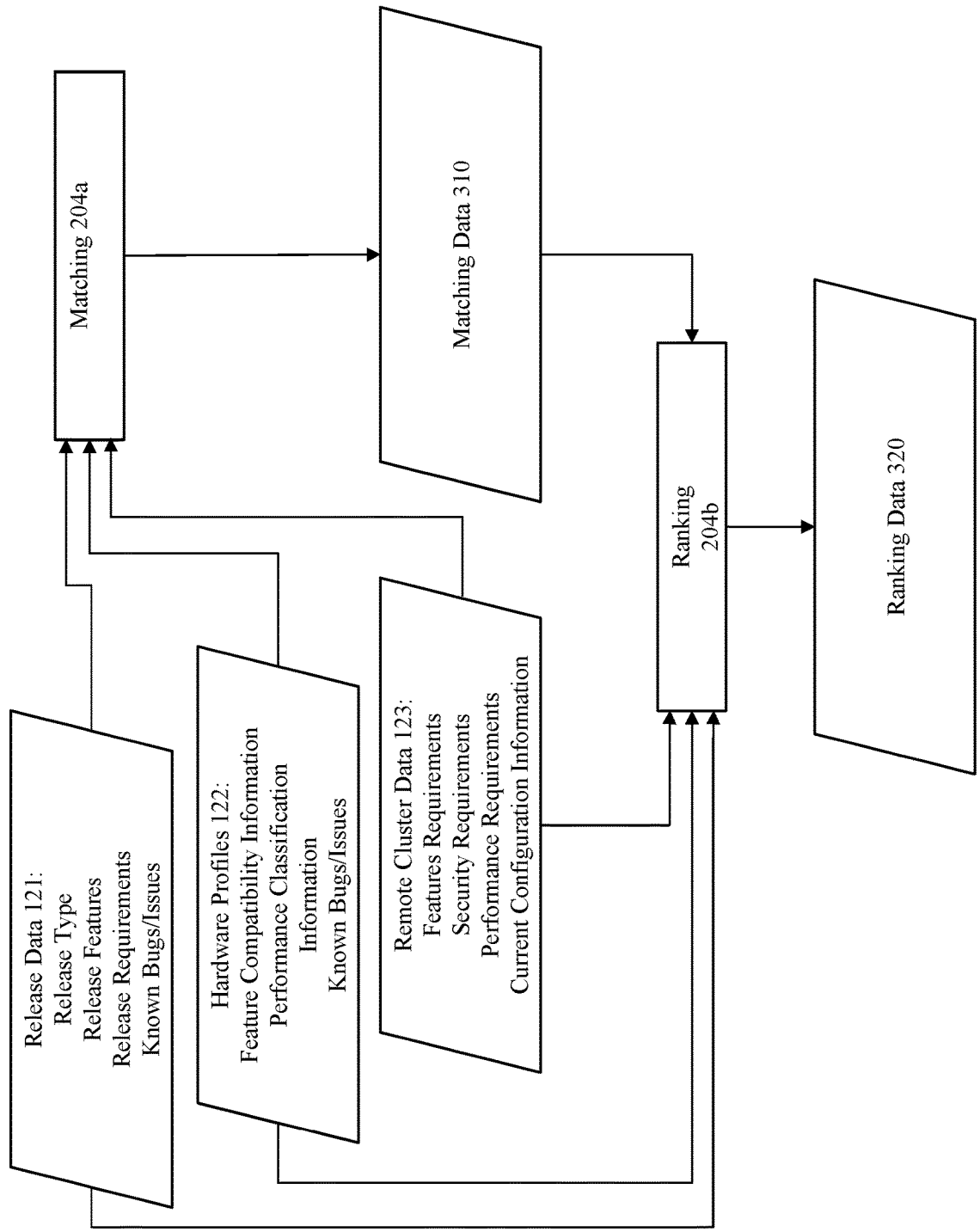
FIG. 3B illustrates an example flow for the matching and ranking in accordance with some embodiments.

FIG. 3B illustrates an example flow for the matching and ranking in accordance with some embodiments. Generally, this process first identifies a set of configurations that would satisfy the requirements of a customer using Boolean logic, and then ranking of those sets of configurations to determine which configuration of the set of configurations would best meet the needs of the customer according to the ranking.

Matching 204*a* comprises analyzing the remote cluster data 123 against the release data 121 and hardware profiles 122 to identify a set of matched results corresponding to a particular collection of hardware, software, and potentially firmware that would meet the needs of a customer as embodied by their corresponding remote cluster data 123. For example, feature matching is performed by first matching the features requirements of 123 to the release features of 121 to identify the releases, or combinations thereof, that include or match the required features as specified by the feature requirements. Subsequently the releases or combinations thereof are filtered to remove those that are incompatible with the current configuration of the system by matching the current configuration information of 123 to one or more hardware profiles 122 and their corresponding feature compatibility information of 122. In some embodiments, security requirements are used as part of a parameter for selection/filtering of the releases or combinations thereof. For instance, a remote cluster administrator specifies require security parameters, such as compliance with an industry or government standard (e.g. HIPAA compliance), where only compliant releases are added to the matching data. In some embodiments, release ranges and release types are specified (e.g. by an administrator). For instance, an administrator could specify that only security updates, critical updates, or sub-number version updates (e.g. okay to go from 6.1 to 6.2 but not 6.1 to 7.1) are allowed, that no downgrades can be made, that a piece of software cannot be changed (e.g. a software that the customer has customized to their needs), or any other overriding requirement. Regardless of the number or particular set of requirements the matching at 204*a* generates a set of matched results, matching data 310, comprising combinations of releases that should meet the needs of the customer.

The matching data 301 is used for ranking 204*b* of the individual results or combinations thereof in the set of matched results. Ranking allows for differentiation of the individual results or combinations thereof in the set of matched results and can be performed using various methods. For instance, the ranking engine can use the known bugs/issues of either or both release data 121 and hardware profiles 122 to generate a stability score, a maturity factor to adjust the stability factor based on the past and present bug/issue reporting data (e.g. age of the release, type of release, bugs/issue reporting trends—increasing or decreasing), performance classification information to generate a utilization score (e.g. the inverse of time period/time during time period of 90%+ CPU utilization, memory utilization) or any other appropriate methods to rank specific characteristics of a particular match of the set of matches. Finally, the ranking can be completed by applying one or more weights to the individual match scores, or factors, and computation of those results, where the final rankings of the set of matches and those results are output to ranking data 320.

FIG. 4A illustrates a flowchart for scheduling each version(s)/update(s) for each respective cluster in accordance with some embodiments.

The process starts at 400 where groups and subgroups are identified and their corresponding clusters or nodes. For instance, a group comprises all retail store clusters for a particular customer, a first set of subgroups correspond to different nations in which those clusters are located, and a second set of subgroups correspond to different regions within each nation. Such groupings can be determined through a default set of rules, or by specification from an administrator, or by some combination thereof (e.g. administrator specifies the group as all retail store locations, while the default rules specify subgroups by region.

Regardless of how each group and subgroup is identified, at 402 the execution mode between each group and subgroup is identified—e.g. simultaneously, staggered, or some combination thereof. For instance, identifying the mode of execution as staggered for a set of groups corresponding to different regions identified by their time zone, where the first time zone selected is pacific time and each time zone west of the pacific time zone region are then selected in order. If we use the example earlier of the groups consisting of the retail stores, each retail store may then be grouped (e.g. in subgroups) based on their hours of operation, where stores within different regions may comprise different subgroups, such as a first subgroup comprising grocery stores open 24 hours a day and a second subgroup comprising grocery stores open from 6 am-9 pm. The members of each subgroup within each time zone or region are identified as having simultaneous execution modes. However, any other combination of update plans can be implemented whether as determined based on one or more rules in the rules engine 301, or by administrator preference information.

At 404 the order of performance is generated. In some embodiments, each individual version/update change is to be completed for all clusters and nodes before proceeding to apply a second version/update change. In some embodiments all version/update changes are to be completed for a respective cluster or node before proceeding to the next group or subgroup. In some embodiments, some version/update changes are to be completed for all cluster/node pairs and some version/update changes are complete for each group and/or subgroup before proceeding. Regardless of which order is to be applied, the process of 404 generates an ordered plurality of cluster/node version/update pairs.

At 406 a cluster/node version/update pair is selected for processing. The selected cluster/node version/update pair being the earliest unscheduled pair in the ordered plurality of cluster/node version/update pairs generated in the previous step. The process for scheduling each pair will be discussed further in regard to FIG. 4B. Briefly, the process includes estimating time for completion and selection and recording of the start time for each pair.

At 409 a determination is made as to whether there are any remaining pairs to be scheduled. By, for instance, accessing the previously generated ordered plurality of cluster/node version/update pairs to determine if there are any remaining pairs to be scheduled after the pair just scheduled. If there are additional pairs to be scheduled, the process continues at 406 where the next pair is selected for processing. However, if no unscheduled pairs remain the process completes at 410 by ending the scheduling process.

Figure 4B:
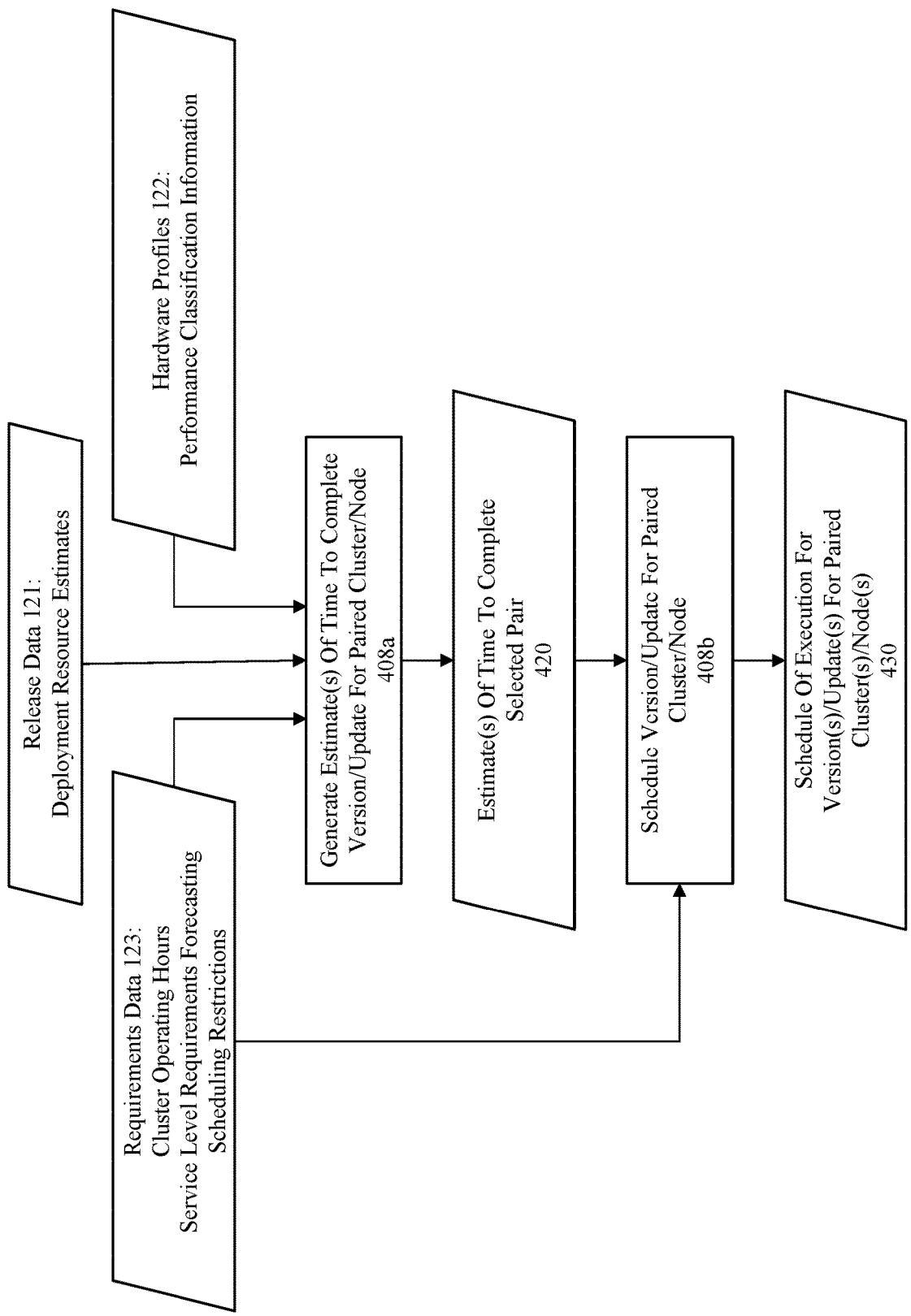
FIG. 4B illustrates an example flow for scheduling selected pairs based on at least corresponding data for remote cluster(s) in accordance with some embodiments.

FIG. 4B illustrates an example flow for scheduling selected pairs based on at least corresponding data for remote cluster(s) in accordance with some embodiments. This process includes a time estimation step for the selected pair followed by a scheduling step for scheduling the execution of the selected pair.

Time estimation is complete at 408a where the estimates are generated for each selected version/update cluster/node pair. Time estimation can be completed using deployment resource estimates of the release data 121, performance classification information from the hardware profiles 122, and the scheduling restriction of the requirements data 123. For instance, the deployment resource estimates can be used to identify resources used by the selected version/update (e.g. TOPS, memory, and storage), and calculations can be performed to estimate the time to complete the deployment on the corresponding hardware using the performance classification information (e.g. computing the time to complete the IOPS, memory reads/writes, and storage I/O operations) to estimate a time to complete the deployment based on one or more rules in the rule base 301. In some embodiments, the time to complete the deployment can be further adjusted based on the requirements data 123 to account for scheduling restrictions, such as a requiring that application updates only utilize 50% of available resources—e.g. because other applications will remain operational during the installation of the update. Once a final time estimate is generated for the selected pair the estimate is stored at 420.

At 408b the time estimate for the selected pair stored at 420 and the requirements data 123 are used to schedule the update. For instance, the selected pair can be scheduled according to one or more rules in rule base 301. For instance, scheduling is completed by using the estimated time and a confidence factor to determine the necessary length of a time window for deploying the version/update—e.g. a confidence factor of 0.9 would indicate that the estimated time is expected to be within 10% of the actual time to complete the version/update. In some embodiments, the selected time window will depend on estimated idle time state values (e.g. times corresponding to idle times for a cluster, nodes of a cluster, or times with the most idle resources).

A first available time window having the necessary length is selected that does not, or is not, expected to violate any of the conditions setup in 402 and 404, based on at least the cluster operating hours as limited by the scheduling restrictions. In some embodiments, execution of the scheduled operation(s) are predicated on one or more conditions being met as discussed in regard to 402 and 404. For instance, scheduling for all members of a group may be conditioned on a previous group having completed scheduled deployments. Additionally, in some embodiments, the scheduling of a subgroup or member of a subgroup may be conditioned on a previous group/subgroup having completed scheduled deployments. In some embodiments, the scheduled time comprises a time range in which the update can be started. In some embodiments, when any precondition to deployment is not satisfied during execution of the update plan by the time the scheduled time occurs (or passes if a range), the scheduling process is restarted for the unfinished version/update changes. Furthermore, in some embodiments the machine learning system 350 causes one or more updates to the rule base 301 corresponding to time estimation and scheduling errors—e.g. decreases a confidence factor and/or updates the deployments resource estimate(s). Once generated the scheduling time/time range and any conditions are stored at 430.

Figure 5:
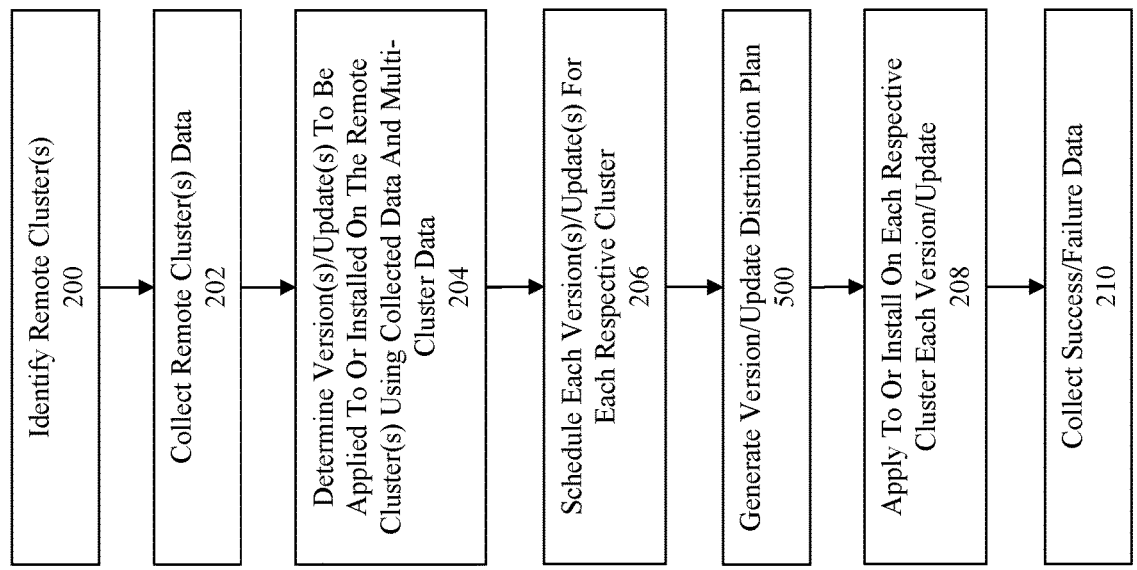
FIG. 5 illustrates an alternate flowchart for data driven and cluster specific version/update control in accordance with some embodiments.

FIG. 5 illustrates an alternate flowchart for data driven and cluster specific version/update control in accordance with some embodiments. FIG. 5 includes the same steps as illustrated in FIG. 2 (see 200, 202, 204, 206, 208, and 210). However, in addition to the steps illustrated in FIG. 2, FIG. 5 includes a distribution plan generation step 500 between 206 and 208.

Figure 6:
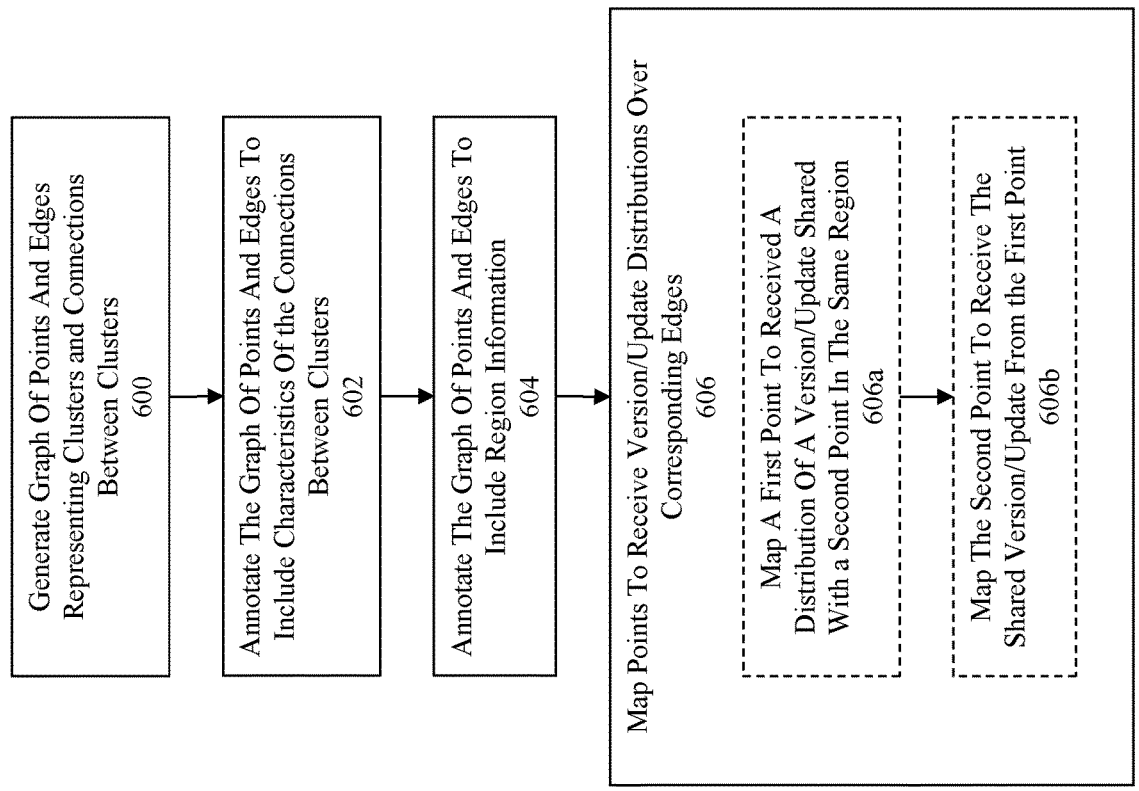
FIG. 6 illustrates a flowchart for generating a version/update distribution plan in accordance with some embodiments.

The distribution plan generation represents a deployment strategy for corresponding version(s)/update(s) to respective nodes/clusters in advance of the execution of any version/update change(s). Generally, the distribution plan identifies from where and when version/update data will be transmitted to remote clusters. FIG. 6 illustrates one possible approach to distributing the version/update data. In some embodiments, all version/update data will be transmitted from a central source, from a geographically nearest remote cluster, or from a cluster identified based of various parameters, such as network speed, available computing capacity, available storage, available bandwidth, or some combination thereof. In some embodiments, the generation of the distribution plan can be predicated on a threshold amount of version/update data to be transmitted—e.g. 100 MB, where if the threshold is not met the data is transferred from the management apparatus to the remote clusters, but not from remote cluster to remote cluster.

In some embodiments, the transmission plans and the transmissions themselves are predicated on threshold determinations regarding the quality of the network connection and the expected or current use thereof. For instance, just prior to transmission plan implementation but after a distribution plan has been generated, the network connections can be analyzed to determine current usage of those network connections (e.g. WAN link speed, latency, quality of service, and/or used capacity). In some embodiments, the current usage information is used to enforce threshold process start conditions (e.g. max usage of 80% of network connection bandwidth), whether based on available percentage or specified bandwidth capacity. In some embodiments, the distribution plan generated specifies one or more rules for determining whether there is available bandwidth to be used for distribution or whether the distribution data is higher priority then at least some of the data currently consuming bandwidth (e.g. long-term backup data is lower priority then the distribution data).

FIG. 6 illustrates a flowchart for generating a version/update distribution plan in accordance with some embodiments.

The process starts at 600 where a graph of points and edges representing clusters and connections between clusters. Here, the points represent clusters, and the edges represent connections between clusters. Thus, the graph of points and edges represent all the connections between relevant remote clusters and the management apparatus, and the remote clusters and other remote clusters.

The graph of points and edges is then annotated at 602 to include characteristics of the corresponding clusters/apparatus. For instance, each point can be annotated with connection characteristics for the corresponding system (clusters/apparatus) including the rated connection speed, the maximum recorded speed, the minimum recorded speed, and the average utilization of the connection. In some embodiments, the characteristics can be limited to a specified time period, such as one day, week, month, quarter, or year. Once the points are annotated the edges between respective points are annotated with any combination of the lowest, highest, or average of the values of the corresponding points connected by the respective edge. For instance, an edge connected two points could be annotated with the lowest rated speed of the corresponding points and the highest average utilization of the corresponding points.

At 604 the graph of points and edges are annotated to include region information. For instance, each point can be annotated to specify its region. In some embodiments, a region may contain one or more sub-regions. Where each region/sub-region relationship corresponds to one or more possibly distribution paths that connect a region to a sub-region.

At 606 the version/update distributions are mapped to corresponding edges on one or more levels. For instance, consider an example international company that defines their highest-level regions as the Americas, Europe, and Asia, and each region has one or more sub-regions corresponding to different time zones. During a first mapping pass, the management apparatus is mapped to one or more remote clusters in each identified region. Subsequently in a second mapping operation, the management apparatus maps the one or more remotes clusters of each identified region to their corresponding sub-regions, such that the one or more remote clusters of the region provide the distributed item(s) to at least one remote cluster in each corresponding sub-region. In a third mapping pass, the management apparatus maps a distribution path within corresponding sub-regions to complete the distribution processes to each remote cluster as necessary. For example, 606a and 606b illustrate a two-level distribution plan, where a first point in the graph of points and edges is mapped to receive a version/update and a second point is mapped to receive the same version/update but from the first point, and where the first point and the second point are in the same region.

In some embodiments, the mapping is output as a distribution plan identifying what each cluster is to receive and to transmit including identification of where each item is received from and where to distribute each received item. Furthermore, in some embodiments, distribution plans may be generated that are generic with respect to which items are to be distributed, where regardless of the item(s) to be distributed they will be distributed along the same routes until an updated distribution plan is received.

Figure 7:
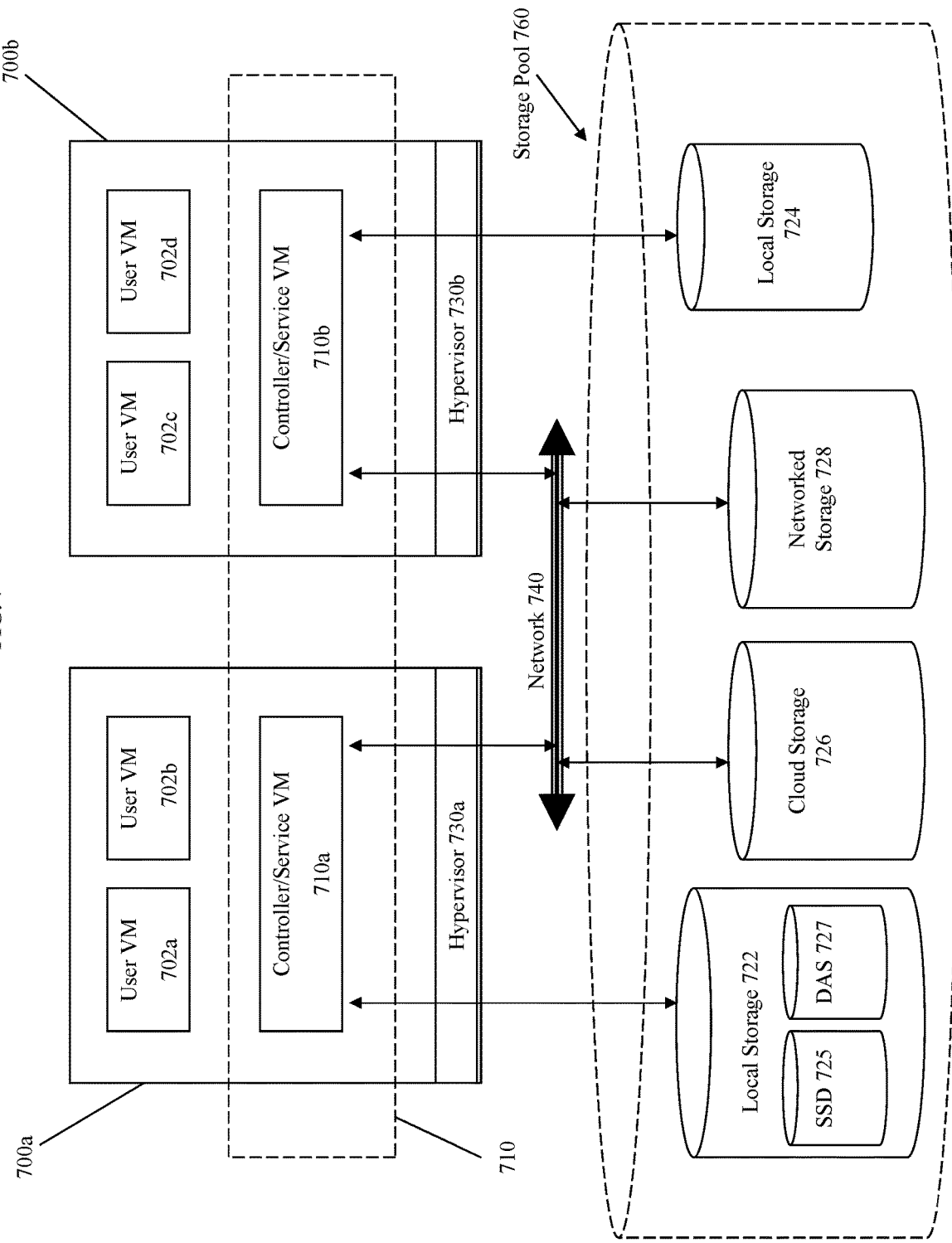
FIG. 7 illustrates a clustered virtualization environment in which some embodiments are implemented.

FIG. 7 illustrates a clustered virtualization environment in which some embodiments are implemented.

In some embodiments, the management apparatus and/or the remote clusters are embodied as clustered virtualization environments, similar to that illustrated in FIG. 7 including any number of servers (e.g. servers/nodes 700a-b) where each node can service one or more automated multi-cluster management functions using controller/service VMs 710a-b or any other notes in the clustered virtualization environment.

The architecture of FIG. 7 can be implemented for a distributed platform that contains multiple servers 700a and 700b that manages multiple-tiers of storage. The multiple tiers of storage may include storage that is accessible through a network 740, such as cloud storage 726 or networked storage 728 (e.g., a SAN or "storage area network"). Unlike the prior art, the present embodiment also permits local storage 722/724 that is within or directly attached to the server and/or appliance to be managed as part of the storage pool 760. Examples of such storage include Solid State Drives (henceforth "SSDs") 725 or Hard Disk Drives (henceforth "HDDs" or "spindle drives") 727. These collected storage devices, both local and networked, form a storage pool 760. Virtual disks (or "vDisks") can be structured from the storage devices in the storage pool 760, as described in more detail below. As used herein, the term vDisk refers to the storage abstraction that is exposed by a controller/service virtual machine to be used by a user virtual machine (VM). In some embodiments, the vDisk is exposed via iSCSI ("internet small computer system interface") or NFS ("network file system") and is mounted as a virtual disk on the user VM.

Each server 700a or 700b runs virtualization software, such as VMware ESX(i), Microsoft Hyper-V, or RedHat KVM. The virtualization software includes a hypervisor 730a/730b to manage the interactions between the underlying hardware and the one or more user VMs 702a, 702b, 702c, and 702d that run client software.

A special VM 710a/710b is used to manage storage and I/O activities according to some embodiment of the invention, which is referred to herein as a "Controller/Service VM". This is the "Storage Controller" in the currently described architecture. Multiple such storage controllers coordinate within a cluster to form a single-system. The Controller/Service VMs 710*a*/710*b* are not formed as part of specific implementations of hypervisors 730*a*/730*b*. Instead, the Controller/Service VMs run as virtual machines above hypervisors 730*a*/730*b* on the various servers 702*a* and 702*b*, and work together to form a distributed system 710 that manages all the storage resources, including the locally attached storage 722/724, the networked storage 728, and the cloud storage 726. Since the Controller/Service VMs run above the hypervisors 730*a*/730*b*, this means that the current approach can be used and implemented within any virtual machine architecture, since the Controller/Service VMs of embodiments of the invention can be used in conjunction with any hypervisor from any virtualization vendor.

Each Controller/Service VM 710*a-b* exports one or more block devices or NFS server targets that appear as disks to the client VMs 702*a-d*. These disks are virtual, since they are implemented by the software running inside the Controller/Service VMs 710*a-b*. Thus, to the user VMs 702*a-d*, the Controller/Service VMs 710*a-b* appear to be exporting a clustered storage appliance that contains some disks. All user data (including the operating system) in the client VMs 702*a-d* resides on these virtual disks.

Significant performance advantages can be gained by allowing the virtualization system to access and utilize local (e.g., server-internal) storage 722 as disclosed herein. This is because I/O performance is typically much faster when performing access to local storage 722 as compared to performing access to networked storage 728 across a network 740. This faster performance for locally attached storage 722 can be increased even further by using certain types of optimized local storage devices, such as SSDs 725. Further details regarding methods and mechanisms for implementing the virtualization environment illustrated in FIG. 7 are described in U.S. Pat. No. 8,601,473, which is hereby incorporated by reference in its entirety.

Figure 8A:
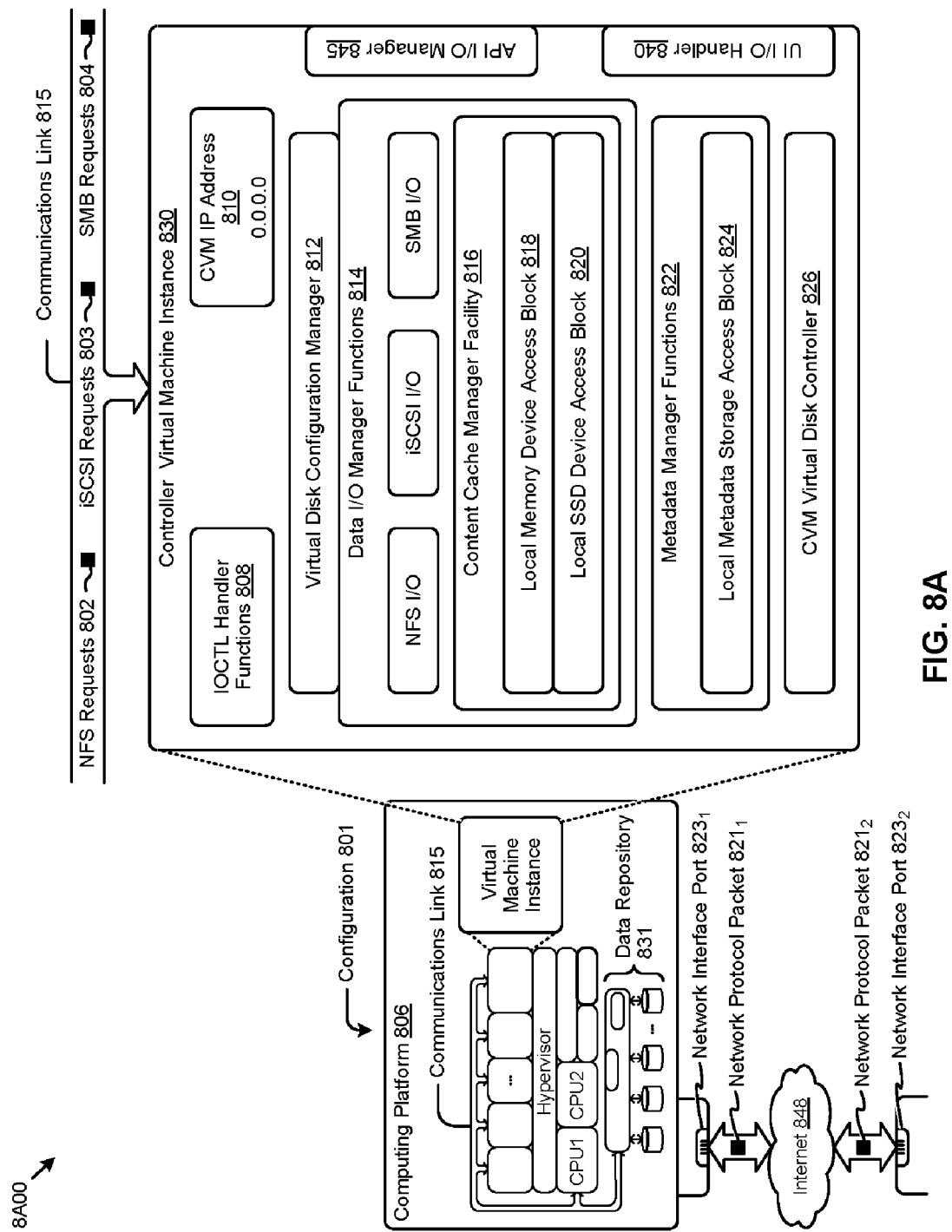
FIG. 8A illustrates a virtualized controller as implemented by the shown virtual machine architecture in which some embodiments are implemented.

FIG. 8A illustrates a virtualized controller as implemented by the shown virtual machine architecture in which some embodiments are implemented. FIG. 8A depicts a virtualized controller as implemented by the shown virtual machine architecture 8A00. The heretofore-disclosed embodiments including variations of any virtualized controllers can be implemented in distributed systems where a plurality of networked-connected devices communicate and coordinate actions using inter-component messaging. Distributed systems are systems of interconnected components that are designed for or dedicated to storage operations as well as being designed for, or dedicated to, computing and/or networking operations. Interconnected components in a distributed system can operate cooperatively to serve a particular objective, such as to provide high-performance computing, high-performance networking capabilities, and/or high-performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyper converged system coordinates efficient use of compute and storage resources by and between the components of the distributed system. Adding a hyper converged unit to a hyper converged system expands the system in multiple dimensions. As an example, adding a hyper converged unit to a hyper converged system can expand in the dimension of storage capacity while concurrently expanding in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyper converged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyper converged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as containers. In some systems and/or environments, hypervisor-assisted virtualization techniques and operating system virtualization techniques are combined.

As shown, the virtual machine architecture 8A00 comprises a collection of interconnected components suitable for implementing embodiments of the present disclosure and/or for use in the herein-described environments. Moreover, the shown virtual machine architecture 8A00 includes a virtual machine instance in a configuration 801 that is further described as pertaining to the controller virtual machine instance 830. A controller virtual machine instance receives block I/O (input/output or IO) storage requests as network file system (NFS) requests in the form of NFS requests 802, and/or internet small computer storage interface (iSCSI) block IO requests in the form of iSCSI requests 803, and/or Samba file system (SMB) requests in the form of SMB requests 804. The controller virtual machine (CVM) instance publishes and responds to an internet protocol (IP) address (e.g., CVM IP address 810). Various forms of input and output (I/O or IO) can be handled by one or more IO control handler functions (e.g., IOCTL functions 808) that interface to other functions such as data IO manager functions 814 and/or metadata manager functions 822. As shown, the data IO manager functions can include communication with a virtual disk configuration manager 812 and/or can include direct or indirect communication with any of various block IO functions (e.g., NFS IO, iSCSI IO, SMB IO, etc.).

In addition to block IO functions, the configuration 801 supports IO of any form (e.g., block IO, streaming IO, packet-based IO, HTTP traffic, etc.) through either or both of a user interface (UI) handler such as UI IO handler 840 and/or through any of a range of application programming interfaces (APIs), possibly through the shown API IO manager 845.

The communications link 815 can be configured to transmit (e.g., send, receive, signal, etc.) any types of communications packets comprising any organization of data items. The data items can comprise payload data, a destination address (e.g., a destination IP address), and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. Additionally, the payload may comprise a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as a random access memory. As shown, the controller virtual machine instance 830 includes a content cache manager facility 816 that accesses storage locations, possibly including local dynamic random access memory (DRAM) (e.g., through the local memory device access block 818) and/or possibly including accesses to local solid state storage (e.g., through local SSD device access block 820).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 831, which in turn can be formatted into any one or more storage areas, and which can comprise parameterized storage accessible by a key (e.g., a filename, a table name, a block address, an offset address, etc.). An external data repository 831 can store any forms of data and may comprise a storage area dedicated to storage of metadata pertaining to the stored forms of data. In some cases, metadata, can be divided into portions. Such portions and/or cache copies can be stored in the external storage data repository and/or in a local storage area (e.g., in local DRAM areas and/or in local SSD areas). Such local storage can be accessed using functions provided by a local metadata storage access block 824. The external data repository 831 can be configured using a CVM virtual disk controller 826, which can in turn manage any number or any configuration of virtual disks.

Execution of the sequences of instructions to practice certain embodiments of the disclosure are performed by one or more processors, or a processing element such as a data processor, or such as a central processing unit (e.g., CPU1, CPU2). According to certain embodiments of the disclosure, two or more instances of a configuration 801 can be coupled by a communications link 815 (e.g., backplane, LAN, PSTN, wired or wireless network, etc.) and each instance may perform respective portions of sequences of instructions as may be required to practice embodiments of the disclosure.

The shown computing platform 806 is interconnected to the Internet 848 through one or more network interface ports (e.g., network interface port $823_1$ and network interface port $823_2$). The configuration 801 can be addressed through one or more network interface ports using an IP address. Any operational element within computing platform 806 can perform sending and receiving operations using any of a range of network protocols, possibly including network protocols that send and receive packets (e.g., network protocol packet $821_1$ and network protocol packet $821_2$).

The computing platform 806 may transmit and receive messages that can be composed of configuration data, and/or any other forms of data and/or instructions organized into a data structure (e.g., communications packets). In some cases, the data structure includes program code instructions (e.g., application code) communicated through the Internet 848 and/or through any one or more instances of communications link 815. Received program code may be processed and/or executed by a CPU as it is received and/or program code may be stored in any volatile or non-volatile storage for later execution. Program code can be transmitted via an upload (e.g., an upload from an access device over the Internet 848 to computing platform 806). Further, program code and/or results of executing program code can be delivered to a particular user via a download (e.g., a download from the computing platform 806 over the Internet 848 to an access device).

The configuration 801 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A first partition and second partition can be congruent (e.g., in a processing element array) or can be different (e.g., comprising disjoint sets of components).

A cluster is often embodied as a collection of computing nodes that can communicate between each other through a local area network (e.g., LAN or VLAN) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provision of power to the other units. In some cases, a unit in a rack is dedicated to environmental conditioning functions such as filtering and movement of air through the rack, and/or temperature control for the rack. Racks can be combined to form larger clusters. For example, the LAN of a first rack having 32 computing nodes can be interfaced with the LAN of a second rack having 16 nodes to form a two-rack cluster of 48 nodes. The former two LANs can be configured as subnets or can be configured as one VLAN. Multiple clusters can communicate between one module to another over a WAN (e.g., when geographically distal) or LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Further details regarding general approaches to managing data repositories are described in U.S. Pat. No. 8,601,473 titled, "ARCHITECTURE FOR MANAGING I/O AND STORAGE FOR A VIRTUALIZATION ENVIRONMENT" issued on Dec. 3, 2013 which is hereby incorporated by reference in its entirety.

Further details regarding general approaches to managing and maintaining data in data repositories are described in U.S. Pat. No. 8,549,518 titled, "METHOD AND SYSTEM FOR IMPLEMENTING MAINTENANCE SERVICE FOR MANAGING I/O AND STORAGE FOR A VIRTUALIZATION ENVIRONMENT" issued on Oct. 1, 2013, which is hereby incorporated by reference in its entirety.

Figure 8B:
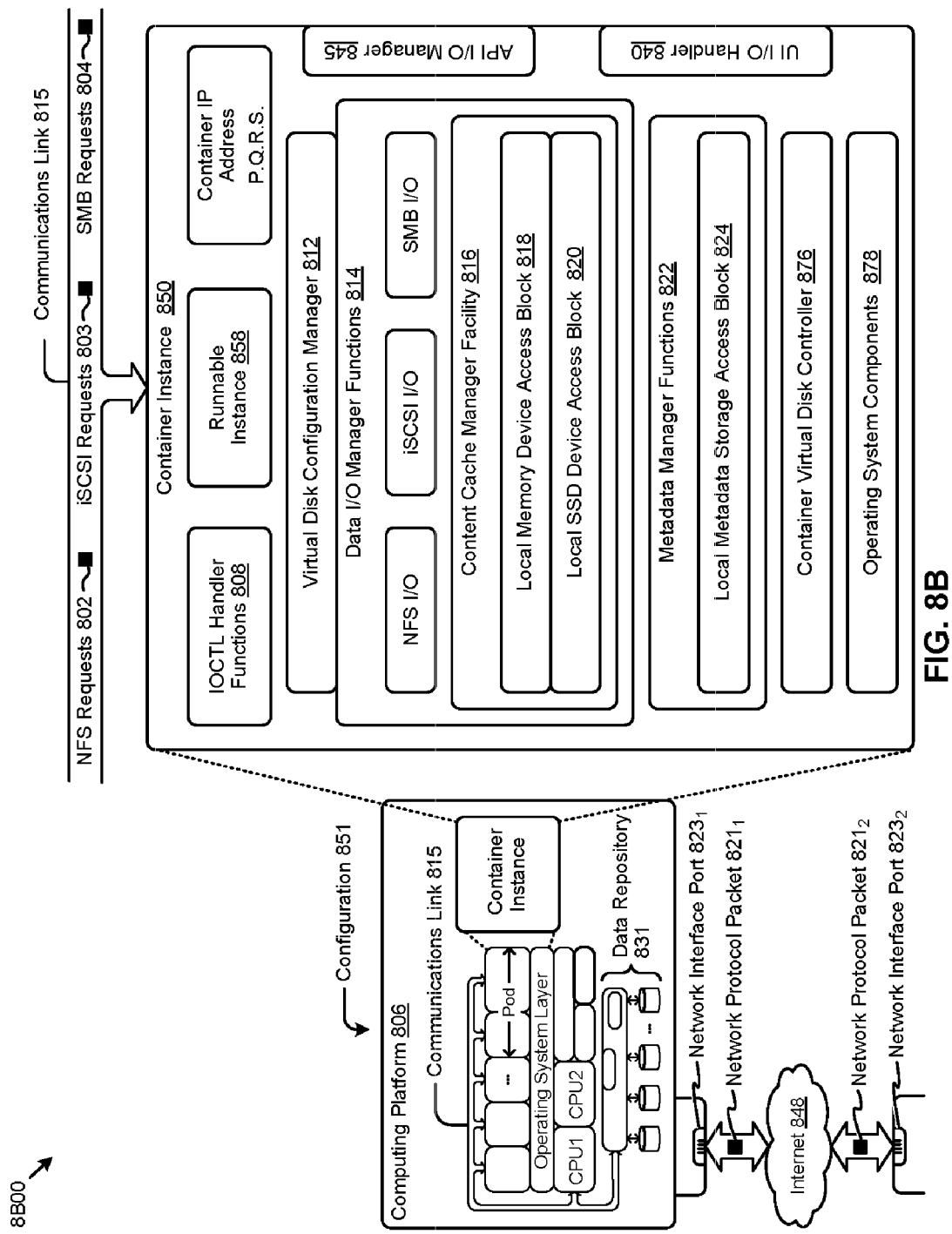
FIG. 8B illustrates a virtualized controller implemented by a containerized architecture in which some embodiments are implemented.

FIG. 8B illustrates a virtualized controller implemented by a containerized architecture in which some embodiments are implemented. FIG. 8B depicts a virtualized controller implemented by a containerized architecture 8B00. The containerized architecture comprises a collection of interconnected components suitable for implementing embodiments of the present disclosure and/or for use in the herein-described environments. Moreover, the shown containerized architecture 8B00 includes a container instance in a configuration 851 that is further described as pertaining to the container instance 850. The configuration 851 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any container (e.g., container instance 850). A container instance can be executed by a processor. Runnable portions of a container instance sometimes derive from a container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within a container might include an image comprising a minimum set of runnable code. Contents of larger libraries and/or code or data that would not be accessed during runtime of the container instance can be omitted from the larger library to form a smaller library composed of only the code or data that would be accessed during runtime of the container instance. In some cases, start-up time for a container instance can be much faster than start-up time for a virtual machine instance, at least because the container image might be much smaller than a respective virtual machine instance. Furthermore, start-up time for a container instance can be much faster than start-up time for a virtual machine instance, at least because the container image might have many fewer code and/or data initialization steps to perform than a respective virtual machine instance.

A container instance (e.g., a Docker container) can serve as an instance of an application container. Any container of any sort can be rooted in a directory system and can be configured to be accessed by file system commands (e.g., "ls" or "ls-a", etc.). The container might optionally include operating system components 878, however such a separate set of operating system components need not be provided. As an alternative, a container can include a runnable instance 858, which is built (e.g., through compilation and linking, or just-in-time compilation, etc.) to include all the library and OS-like functions needed for execution of the runnable instance. In some cases, a runnable instance can be built with a virtual disk configuration manager, any of a variety of data IO management functions, etc. In some cases, a runnable instance includes code for, and access to, a container virtual disk controller 876. Such a container virtual disk controller can perform any of the functions that the aforementioned CVM virtual disk controller 826 can perform, yet such a container virtual disk controller does not rely on a hypervisor or any particular operating system so as to perform its range of functions.

In some environments multiple containers can be collocated and/or can share one or more contexts. For example, multiple containers that share access to a virtual disk can be assembled into a pod (e.g., a Kubernetes pod). Pods provide sharing mechanisms (e.g., when multiple containers are amalgamated into the scope of a pod) as well as isolation mechanisms (e.g., such that the namespace scope of one pod does not share the namespace scope of another pod).

Embodiments as disclosed herein may be implemented in both the virtual machine architecture 8A00 or the containerized architecture 8B00.

System Architecture

Figure 9:
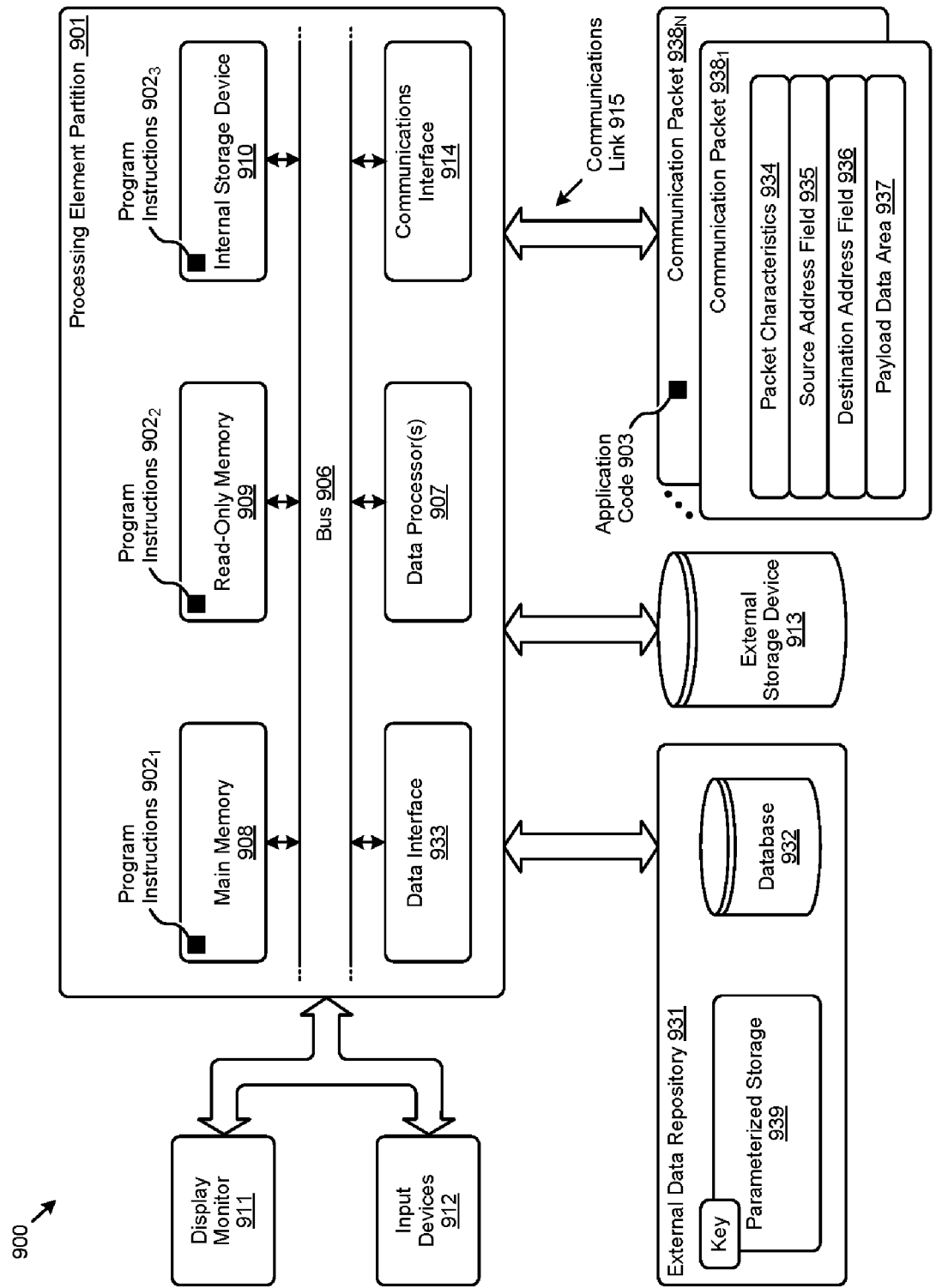
FIG. 9 is a block diagram of an illustrative computing system suitable for implementing an embodiment of the present invention.

FIG. 9 depicts a block diagram of an instance of a computer system 900 suitable for implementing embodiments of the present disclosure. Computer system 900 includes a bus 906 or other communication mechanism for communicating information. The bus interconnects subsystems and devices such as a CPU, or a multi-core CPU (e.g., data processor 907), a system memory (e.g., main memory 908, or an area of random access memory (RAM)), a non-volatile storage device or non-volatile storage area (e.g., read-only memory 909), an internal storage device 910 or external storage device 913 (e.g., magnetic or optical), a data interface 933, a communications interface 914 (e.g., PHY, MAC, Ethernet interface, modem, etc.). The aforementioned components are shown within processing element partition 901, however other partitions are possible. The shown computer system 900 further comprises a display 911 (e.g., CRT or LCD), various input devices 912 (e.g., keyboard, cursor control), and an external data repository 931.

According to an embodiment of the disclosure, computer system 900 performs specific operations by data processor 907 executing one or more sequences of one or more program code instructions contained in a memory. Such instructions (e.g., program instructions $9021$, program instructions $9022$, program instructions $9023$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 900 performs specific networking operations using one or more instances of communications interface 914. Instances of the communications interface 914 may comprise one or more networking ports that are configurable (e.g., pertaining to speed, protocol, physical layer characteristics, media access characteristics, etc.) and any particular instance of the communications interface 914 or port thereto can be configured differently from any other instance. Portions of a communication protocol can be carried out in whole or in part by any instance of the communications interface 914, and data (e.g., packets, data structures, bit fields, etc.) can be positioned in storage locations within communications interface 914, or within system memory, and such data can be accessed (e.g., using random access addressing, or using direct memory access DMA, etc.) by devices such as data processor 907.

The communications link 915 can be configured to transmit (e.g., send, receive, signal, etc.) any types of communications packets (e.g., communications packet $938_1$, communications packet $938_N$) comprising any organization of data items. The data items can comprise a payload data area 937, a destination address 936 (e.g., a destination IP address), a source address 935 (e.g., a source IP address), and can include various encodings or formatting of bit fields to populate the shown packet characteristics 934. In some cases, the packet characteristics include a version identifier, a packet or payload length, a traffic class, a flow label, etc. In some cases, the payload data area 937 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 907 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 931, which in turn can be formatted into any one or more storage areas, and which can comprise parameterized storage 939 accessible by a key (e.g., filename, table name, block address, offset address, etc.).

Execution of the sequences of instructions to practice certain embodiments of the disclosure are performed by a single instance of the computer system 900. According to certain embodiments of the disclosure, two or more instances of computer system 900 coupled by a communications link 915 (e.g., LAN, PTSN, or wireless network) may perform the sequence of instructions required to practice embodiments of the disclosure using two or more instances of components of computer system 900.

The computer system 900 may transmit and receive messages such as data and/or instructions organized into a data structure (e.g., communications packets). The data structure can include program instructions (e.g., application code 903), communicated through communications link 915 and communications interface 914. Received program code may be executed by data processor 907 as it is received and/or stored in the shown storage device or in or upon any other non-volatile storage for later execution. Computer system 900 may communicate through a data interface 933 to a database 932 on an external data repository 931. Data items in a database can be accessed using a primary key (e.g., a relational database primary key).

The processing element partition 901 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A first partition and second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 907. Some embodiments include one or more special-purpose hardware components (e.g., power control, logic, sensors, transducers, etc.).

Various implementations of the database 932 comprise storage media organized to hold a series of records or files such that individual records or files are accessed using a name or key (e.g., a primary key or a combination of keys and/or query clauses). Such files or records can be organized into one or more data structures Such files or records can be brought into and/or stored in volatile or non-volatile memory.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer-implemented method, comprising:
   identifying individual candidate release of a software that matches a cluster specific requirement of a computing cluster by matching computing cluster data to release data or matching computing cluster data to a hardware profile;
   ranking a version of software currently installed on the computing cluster and the individual candidate release based on a metric, wherein the individual candidate release corresponds to a different version of the software currently installed on the computing cluster; and selecting, based on said ranking, either to maintain the version of software currently installed on the computing cluster when the version of software currently installed on the computing cluster is ranked better than the individual candidate release, or to install the individual candidate release to change the version of the software currently installed on the computing cluster when the individual candidate release is ranked better than the version of software currently installed on the computing cluster, wherein the individual candidate released is installed by:
  scheduling installation of the individual candidate release on a node of the computing cluster over a first time period using a rule; and
  generating a distribution plan for the individual candidate release, the distribution plan comprising a source and a destination, wherein the source transmits the individual candidate release to the destination.

2. The method of claim 1, wherein a plurality of clusters are located at a plurality different locations and the metric corresponds to two or more clusters of the plurality of clusters.

3. The method of claim 1, wherein the individual candidate release corresponds to a feature requirement, a security requirement, a performance requirement, or current configuration information.

4. The method of claim 1, wherein selecting the individual candidate release to be installed depends on one or more rules generated by a machine learning process.

5. The method of claim 1, wherein the rule is modified by a machine learning process based on a difference between an expected time period for completion and an actual time period for completion of installation of the individual candidate release on a respective computing cluster.

6. The method of claim 1, wherein the individual candidate release is identified by matching corresponding cluster data to release data and a hardware profile to identify a supported release based on at least a rule base.

7. The method of claim 6, wherein the release data comprises a release type, a release feature, a release requirement, or a known bug/issue, and the hardware profile comprises feature compatibility information, performance classification information, or a known bug/issue for a hardware device.

8. The method of claim 1, wherein the ranking of the individual candidate release is adjusted based on a machine learning process and a specific combination of hardware and software in the computing cluster for the individual candidate release.

9. A non-transitory computer readable medium having stored thereon a sequence of instructions which, when executed by a processor performs a set of acts, the set of acts comprising:
  identifying individual candidate release of a software that matches a cluster specific requirement of a computing cluster by matching computing cluster data to release data or matching computing cluster data to a hardware profile;
  ranking a version of software currently installed on the computing cluster and the individual candidate release based on a metric, wherein the individual candidate release corresponds to a different version of the software currently installed on the computing cluster; and
  selecting, based on said ranking, either to maintain the version of software currently installed on the computing cluster when the version of software currently installed on the computing cluster is ranked better than the individual candidate release, or to install the individual candidate release to change the version of the software currently installed on the computing cluster when the individual candidate release is ranked better than the version of software currently installed on the computing cluster, wherein the individual candidate released is installed by:
    scheduling installation of the individual candidate release on a node of the computing cluster over a first time period using a rule; and—
    generating a distribution plan for the individual candidate release, the distribution plan comprising a source and a destination, wherein the source transmits the individual candidate release to the destination.

10. The computer readable medium of claim 9, wherein a plurality of clusters are located at a plurality different locations and the metric corresponds to two or more clusters of the plurality of clusters.

11. The computer readable medium of claim 9, wherein the individual candidate release corresponds to a feature requirement, a security requirement, a performance requirement, or current configuration information.

12. The computer readable medium of claim 9, wherein selecting the individual candidate release to be installed depends on one or more rules generated by a machine learning process.

13. The computer readable medium of claim 9, wherein the rule is modified by a machine learning process based on a difference between an expected time period for completion and an actual time period for completion of installation of the individual candidate release on a respective computing cluster.

14. The computer readable medium of claim 9, wherein the individual candidate release is identified by matching corresponding cluster data to release data and a hardware profile to identify a supported release based on at least a rule base.

15. The computer readable medium of claim 14, wherein the release data comprises a release type, a release feature, a release requirement, or a known bug/issue, and the hardware profile comprises feature compatibility information, performance classification information, or a known bug/issue for a hardware device.

16. The computer readable medium of claim 9, wherein the ranking of the individual candidate release is adjusted based on a machine learning process and a specific combination of hardware and software in the computing cluster for the individual candidate release.

17. A system, comprising:
  a memory for storing a sequence of instructions; and
  a processor that executes the sequence of instructions to perform a set of acts, the set of acts comprising:
    identifying individual candidate release of a software that matches a cluster specific requirement of a computing cluster by matching computing cluster data to release data or matching computing cluster data to a hardware profile;
    ranking a version of software currently installed on the computing cluster and the individual candidate release based on a metric, wherein the individual candidate release corresponds to a different version of the software currently installed on the computing cluster; and
    selecting, based on said ranking, either to maintain the version of software currently installed on the computing cluster when the version of software currently installed on the computing cluster is ranked better than the individual candidate release, or to install the individual candidate release to change the version of the software currently installed on the computing cluster when the individual candidate release is ranked better than the version of software currently installed on the computing cluster, wherein the individual candidate released is installed by:
- scheduling installation of the individual candidate release on a node of the computing cluster over a first time period using a rule; and—
- generating a distribution plan for the individual candidate release, the distribution plan comprising a source and a destination, wherein the source transmits the individual candidate release to the destination.

18. The system of claim 17, wherein a plurality of clusters are located at a plurality different locations and the metric corresponds to two or more clusters of the plurality of clusters.

19. The system of claim 17, wherein the individual candidate releases correspond to a feature requirement, a security requirement, a performance requirement, or current configuration information.

20. The system of claim 17, wherein the individual candidate release is identified by matching corresponding cluster data to release data and a hardware profile to identify a supported release based on at least a rule base.

21. The system of claim 17, wherein selecting the individual candidate release to be installed depends on one or more rules generated by a machine learning process.

22. The system of claim 17, wherein the rule is modified by a machine learning process based on a difference between an expected time period for completion and an actual time period for completion of installation of the individual candidate release on a respective computing cluster.

23. The system of claim 22, wherein the release data comprises a release type, a release feature, a release requirement, or a known bug/issue, and the hardware profile comprises feature compatibility information, performance classification information, or a known bug/issue for a hardware device.

24. The system of claim 17, wherein the ranking of the individual candidate release is adjusted based on a machine learning process and a specific combination of hardware and software in the computing cluster for the individual candidate release.

* * * * *